(12) United States Patent
Uchida et al.

(10) Patent No.: US 8,768,949 B2
(45) Date of Patent: Jul. 1, 2014

(54) DOCUMENT MANAGEMENT USER INTERFACE WITH USER CUSTOMIZED APPLICATION FUNCTIONALITIES

(75) Inventors: Yuki Uchida, West Caldwell, NJ (US); Shun Tanaka, West Caldwell, NJ (US); Kazuhiko Kato, West Caldwell, NJ (US)

(73) Assignee: Ricoh Company, Ltd., Tokyo (JP)

( * ) Notice: Subject to any disclaimer, the term of this patent is extended or adjusted under 35 U.S.C. 154(b) by 722 days.

(21) Appl. No.: 12/722,370

(22) Filed: Mar. 11, 2010

(65) Prior Publication Data

US 2011/0225493 A1 Sep. 15, 2011

(51) Int. Cl.
G06F 17/30 (2006.01)
G06F 7/00 (2006.01)

(52) U.S. Cl.
USPC ........................................ 707/767

(58) Field of Classification Search
USPC ........................................ 707/767
See application file for complete search history.

(56) References Cited

U.S. PATENT DOCUMENTS

| | | | |
|---|---|---|---|
| 7,117,247 B2 | 10/2006 | Hyakutake et al. | |
| 7,142,690 B2 | 11/2006 | Hyakutake et al. | |
| 7,149,784 B2 | 12/2006 | Kitada et al. | |
| 7,194,433 B1 | 3/2007 | Hyakutake et al. | |
| 7,227,655 B1 | 6/2007 | Uchida et al. | |
| 7,321,867 B1 | 1/2008 | Uchida et al. | |
| 7,415,441 B1 | 8/2008 | Uchida | |
| 7,599,864 B2 | 10/2009 | Uchida et al. | |
| 7,624,045 B2 | 11/2009 | Uchida et al. | |
| 2005/0010475 A1* | 1/2005 | Perkowski et al. | 705/14 |
| 2008/0291471 A1 | 11/2008 | Uchida | |
| 2009/0276413 A1 | 11/2009 | Uchida | |
| 2009/0276771 A1* | 11/2009 | Nickolov et al. | 717/177 |
| 2010/0095354 A1 | 4/2010 | Uchida et al. | |
| 2010/0131584 A1* | 5/2010 | Johnson | 709/203 |
| 2011/0025715 A1 | 2/2011 | Uchida et al. | |
| 2011/0145753 A1* | 6/2011 | Prakash | 715/783 |
| 2011/0173270 A1 | 7/2011 | Uchida et al. | |

OTHER PUBLICATIONS

U.S. Appl. No. 12/722,367, filed Mar. 11, 2010.
U.S. Appl. No. 12/722,374, filed Mar. 11, 2010.
U.S. Appl. No. 12/722,376, filed Mar. 11, 2010.
U.S. Appl. No. 12/722,381, filed Mar. 11, 2010.
U.S. Appl. No. 12/722,367, filed Mar. 11, 2010 of Yuki Uchida et al.
U.S. Appl. No. 12/722,374, filed Mar. 11, 2010 of Yuki Uchida et al.
U.S. Appl. No. 12/722,376, filed Mar. 11, 2010 of Yuki Uchida et al.
U.S. Appl. No. 12/722,381, filed Mar. 11, 2010 of Yuki Uchida et al.

(Continued)

*Primary Examiner* — Kuen Lu
(74) *Attorney, Agent, or Firm* — Cooper & Dunham LLP

(57) ABSTRACT

Apparatuses, systems and methods are provided for accessing a document management application through a network, wherein for each application user, application functionalities in the application user interface are customized for that application user by means of a registration user interface through which specific application functionalities can be selected and registered for the application user.

22 Claims, 18 Drawing Sheets

(56) References Cited

OTHER PUBLICATIONS

U.S. Appl. No. 12/958,686, filed Dec. 2, 2010 of Shun Tanaka.
U.S. Appl. No. 13/014,384, filed Jan. 26, 2011 of Shun Tanaka.
U.S. Appl. No. 13/036,455, filed Feb. 28, 2011 of Shun Tanaka.
U.S. Appl. No. 13/036,558, filed Feb. 28, 2011 of Shun Tanaka.
U.S. Appl. No. 13/036,644, filed Feb. 28, 2011 of Shun Tanaka.
U.S. Appl. No. 13/036,745, filed Feb. 28, 2011 of Shun Tanaka et al.
U.S. Appl. No. 13/086,608, filed Apr. 14, 2011 of Shun Tanaka et al.
U.S. Appl. No. 13/086,779, filed Apr. 14, 2011 of Shun Tanaka et al.

* cited by examiner

REGISTRATION USER INTERFACE
Screen A: Register Specific User

| Full Name: | John A. Smith |
| Username: | John.Smith |
| Password: | 123!@# |
| Organization: | XYZ Corporation |
| Department: | Product Research & Development |
| Office Address: | Suite 123, Sample Road, City, State |
| Office Phone: | (123) 456-7890 |

[Complete]

Fig. 3A

REGISTRATION USER INTERFACE
Screen B: Register Application Functionalities

| Macro: Patient Medical Records |
|---|
| Macro: Patient Billing Records |
| Macro: Pathology Test Results |

| Add Another Application Functionality |
|---|

Type: Macro

Name: Patient Medical Records

Step 1: Upload <<specified doc>> to:

g://XYZCorporation//Medical//Records//Patient//NewPatient//Pediatric//Lab4315/

Save    Delete

| USER INFORMATION ||
|---|---|
| USERNAME | FUNCTIONALITIES INFORMATION |
| John.Smith | Macro: Patient Medical Records<br>Macro: Patient Billing Records<br>Macro: Pathology Test Results<br>...<br>...<br>... |
| Jane.Doe | Search: Discovery Material<br>Search: Petitions & Briefs<br>Search: Invoices<br>...<br>...<br>... |
| ... | ... |
| ... | ... |
| ... | ... |

Fig. 4B

| USER INFORMATION | | |
|---|---|---|
| USERNAME | BUSINESS RELEVANCY INFORMATION | USER INTERFACE INFORMATION |
| John.Smith | Medical | MedMacro479 |
| Jane.Doe | Legal | LegalSerach281 |
| James.Sample | Legal | LegalMacro9u4 |
| Julie.Bravo | Legal | LegalSearch453 |
| Jim.Alpha | - | Custom XYZ |
| Jeffrey.Oscar | Scientific Financial | ScienceSearch999 |
| ... | ... | ... |
| ... | ... | ... |
| ... | ... | ... |
| ... | ... | ... |
| ... | ... | ... |

REGISTRATION USER INTERFACE
Screen B: Register Application Functionalities

| Search: Invoices | Type: Search |
| | Document Type: ☑ Invoices |
| Search: Discovery Material | Document Parameters: |
| | ☑ Date Created: | Last 24 Hours |
| | ☑ Author: | John.Smith |
| Search: Petitions and Briefs | ☑ Directory: | g://XYZ//updates/ |
| | ☑ Format: | Microsoft Word |
| Add Another Application Functionality | Delete | Save |

Fig. 7A

OPERATIONS USER INTERFACE
for User: Jane Doe

SEARCH FUNCTION: INVOICES

Document Type: Invoices

Document Parameters:

| Date Created: | Last 24 Hours |
| Author: | John.Smith |
| Directory: | g://XYZ//updates |
| Format: | Microsoft Word |

SEARCH    CANCEL

| ACCESS CONTROL INFORMATION ||
|---|---|
| USERNAME | ACCESS CONTROL LIST |
| John.Smith | A,B,C |
| Jane.Doe | A,B,C,D |
| James.Sample | E,H,I |
| Julie.Bravo | S,T,U,V,W,X |
| Jim.Alpha | A,T,X |
| Jeffrey.Oscar | B,D,F,G |
| ... | ... |
| ... | ... |
| ... | ... |
| ... | ... |
| ... | ... |

DOCUMENT MANAGEMENT USER INTERFACE WITH USER CUSTOMIZED APPLICATION FUNCTIONALITIES

TECHNICAL FIELD

This disclosure relates to systems, apparatuses and methodologies for managing and exchanging documents and files.

BACKGROUND

In the current information age, information technology (IT) tools for managing files and data are extensively used in enterprises and other organizations, in order to store and transfer electronic documents and data over a network.

A document management system (for example, DocumentMall) can provide users with remote access (that is, through a network) to software applications and related services that would otherwise have to be installed on the user's local computer. For example, such a document management system may be configured to store documents as electronic files in a network-connected (and secure) document storage device, in order to protect the documents from theft or loss and to avoid unnecessarily occupying storage space local to the user computer or local computing environment, while making such files available on demand. The documents may include voluminous and/or sensitive material, and may be configured to provide searchable databases of all forms of legal, medical, financial, educational, scientific, and marketing documents for individuals and/or companies via a network.

Typically, when a conventional document management system receives user input of a request to retrieve a specific document from document storage of the document management system, the document management system transmits an instruction to the document storage based on the user input, and receives data (for the requested document) from the document storage in response to the instruction. The document management system then transmits the data returned from the document storage part to the user. FIG. 1A depicts an example of such a system 100, where client terminals 12-1 through 12-4 may upload and download documents to/from the document storage of the document management system 15, via the network 11.

There is a drawback, however, in that a user interface of such a conventional document management system is often static and inflexible, with the same set of rigid options presented to all users. This is despite the fact that certain groups of users may be interested in consistently accessing a specific set of services or application functionalities of the document management system.

FIG. 1B depicts an example of a typical static user interface of a conventional document management system. The user interface provides only basic options to all users for searching documents. In particular, a user is often forced to use a cumbersome explorer-type interface which requires the user to browse through all of the possible options that the universe of users may wish to access, and/or requires the user to drill down several levels (if a hierarchical presentation of such all possible options is presented).

There exists a need for an improved document management system which is not as difficult and time-consuming to use.

SUMMARY

This disclosure provides user interface tools (in the form of systems, apparatuses, methodologies, computer program products, etc.) for managing and accessing documents (or files).

In an aspect of this disclosure, a registration user interface is provided for registration of a specific user in a registration session, and selection of specific ones of a plurality of application functionalities of a document management apparatus for the specific user and registration of the selected application functionalities in connection with the user registration; user information, including functionalities information indicating the specific application functionalities registered for the specific user, is maintained for the specific user; and the functionalities information indicating the specific application functionalities registered for the specific user, are retrieved upon login by the specific user in a later operations session, and a user interface showing the retrieved functionalities information indicating the specific application functionalities for the specific user is provided in the later session.

In another aspect, the registration user interface provides a view of the operations user interface including the selected application functionalities, and requests confirmation that the operations user interface including the selected application functionalities is to be provided when the specific user logins in the later operations session.

In another aspect, after the view of the operations user interface is displayed, the registration user interface allows the user to unselect one or more of the selected application functionalities, and the registration user interface provides an updated view of the operations user interface without the unselected application functionality.

In another aspect, at least one of the selected application functionalities include one or more document parameters, other than document name, selected during the registration session and registered for the selected application functionality, and the application functionality is provided in the operations user interface when the specific user logins in the later operations session, along with the one or more document parameters registered for the application functionality, and not including other document parameters in the document management apparatus that were not registered for the application functionality.

In another aspect, the operations user interface includes a search part, and during the registration session, the registration user interface permits selection of a subset, less than all, of document parameters in the document management apparatus, and the subset of selected document parameters are registered for the search part, and the search part of the operations user interface provided when the specific user logins in the later operations session allows for user selection from the registered document parameters, and not from other document parameters in the document management apparatus that were not registered for the search part.

In another aspect, at least one of the application functionalities is registered with only document types selected during the registration session, and the application functionality is provided in the operations user interface when the specific user logins in the later operations session, along with the document types registered for the application functionality, and not including other document types in the document management apparatus that were not registered for the application functionality.

BRIEF DESCRIPTION OF THE DRAWINGS

The above-mentioned and other features, aspects and advantages can be more readily understood from the following detailed description with reference to the accompanying drawings wherein:

FIGS. 3A and 3B show examples of screens of a registration user interface;

FIGS. 4A and 4B show examples of user information;

FIG. 7A shows an example of a screen of a registration user interface;

FIGS. 7B and 7C show examples of screens of an operations user interface;

FIG. 9 shows an example of access control information;

DETAILED DESCRIPTION

Figure 1A:
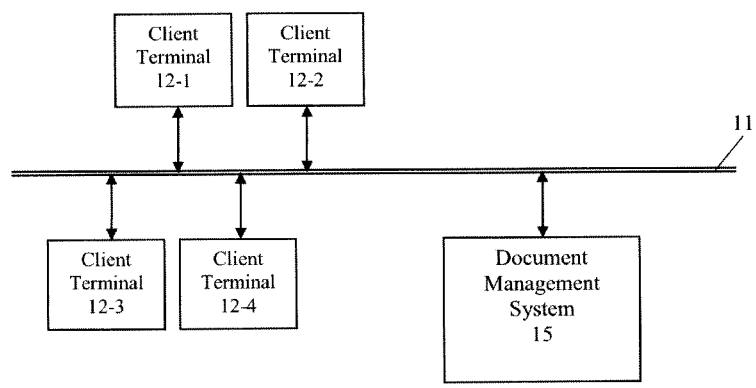
FIG. 1A shows a block diagram of a conventional system.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. In addition, a detailed description of known functions and configurations will be omitted when it may obscure the subject matter of the present invention.

Figure 2:
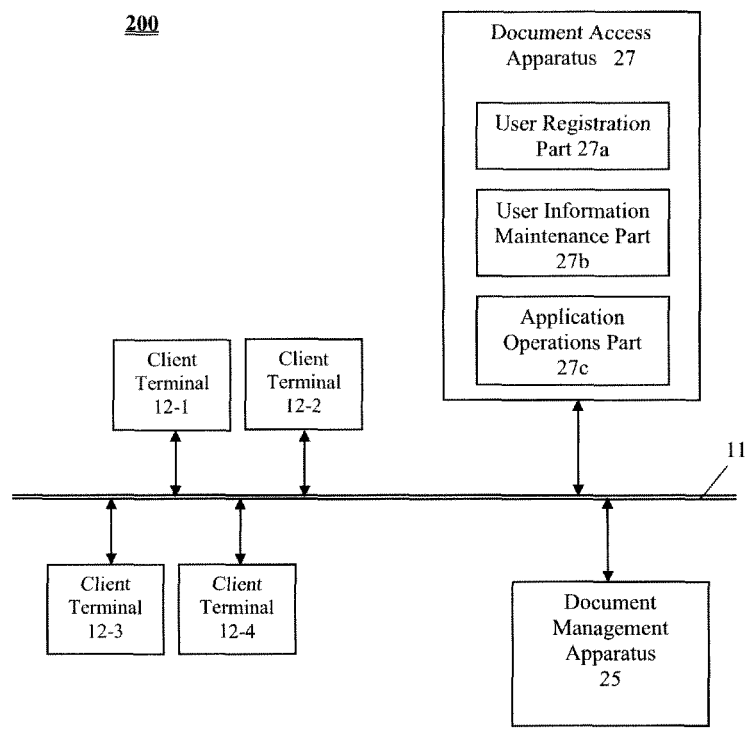
FIG. 2 shows a block diagram of a system, according to an exemplary embodiment of this disclosure.

Referring now to the drawings, wherein like reference numerals designate identical or corresponding parts throughout the several views, FIG. 2 shows schematically a system 200 for streamlining access in a document management system, according to an exemplary embodiment of this disclosure.

System 200 includes a plurality of client terminals 12-1 through 12-4, a document management apparatus 25, and a document access apparatus (or also referenced herein as "application user interface apparatus") 27, all of which are interconnected by a network 11.

Figure 1B:
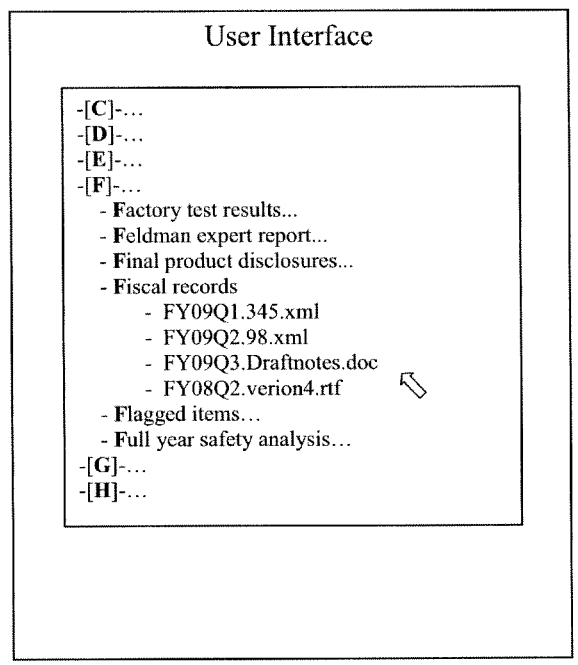
FIG. 1B shows a user interface of a conventional system.

The document management apparatus 25 may be substantially similar to the document management system 15 depicted in FIG. 1, and may include a plurality of application functionalities. The plurality of client terminals 12-1 through 12-4 may be substantially similar to those depicted in FIG. 1. In particular, the client terminals 12-1 through 12-4 are configured with software allowing the client terminals to communicate through the network 11 with at least the document access apparatus 27 and preferably also the document management apparatus 25. In particular, the client terminals 12-1 through 12-4 may transmit data to, and receive data from, the document access apparatus 27.

Document access apparatus 27 includes a user registration part 27a, user information maintenance part 27b, and an application operations part 27c.

The user registration part 27a is configured to provide a registration user interface, for registration of a specific user in a registration session. An example of a first screen of a registration user interface, provided by the user registration part 27a during a registration session for registration of a specific user, is depicted in FIG. 3A. This first screen of the registration user interface may be used to register a user "John Smith" by, for example, allowing the user to enter in data such as the user's full name, username, password, organization, department, office address, office phone number, etc. . . . as seen in FIG. 3A. This data may be maintained by the user information maintenance part 27b of the document access apparatus 27, as will be discussed below.

It should be apparent that the data entered for registration of the specific user is not limited to that shown in FIG. 3A, which merely presents an example. In particular, the user can instead (or in addition) store various other data, including any data that may be used to identify a user of a client terminal that may be in communication with a document management apparatus. For example, the data can include a plurality of names, addresses, screen names, email addresses, facsimile numbers, etc. The data may include biometric information (such as fingerprints, palm prints, voice or speech, retinas or irises, facial expressions or features, signature, etc).

In addition to registering a specific user in a registration session, the registration user interface provided by the user registration part 27a is also configured for selection (during the registration session) of specific ones of a plurality of application functionalities of the document management apparatus for the specific user. The selected application functionalities are then registered in connection with the user registration of the specific user.

An example of a second screen of a registration user interface, provided by the user registration part 27a in a registration session for selection and registration of application functionalities of a document management apparatus, is depicted in FIG. 3B.

The application functionalities of the document management apparatus, as described in this disclosure, may be one of any of a plurality of features and functions provided for users by the document management apparatus. For example, the application functionality may be a specific command to access, view or edit document data or a document database, or a specific command to upload document data to a document database, or a specific command to download document data from a document database. Moreover, an application functionality of the document management apparatus may be a command for the user to select that corresponds to a macro specified by the user, where a macro is a series of instructions that are executed one after the other in a selected order.

In the example of FIG. 3B, the user has so far selected and registered three application functionalities. The three application functionalities are user-defined macros that have been named 'Patient Medical Records', 'Patient Billing Records' and 'Pathology Test Results'. It will be seen that the first selected application functionality named 'Patient Medical Records' is a macro that has been specified by the user to include the step of uploading document to a selected directory address. Thus, it is possible that when a user selects a document and then selects the macro 'Patient Medical Records', the selected document will be uploaded directly to the specified directory address. The user may perform this operation by selecting and dragging an icon of the document from a desktop display over to a 'Patient Medical Records' macro button, for example.

It should be apparent that the application functionalities selected and registered by the specific user are not limited to that shown in FIG. 3B, which merely presents an example. The registration user interface is configured to allow a specific user to define, select and register one of any of a plurality of application functionalities of the document management apparatus.

For example, suppose a user of a document management system regularly uploads a new kind of document daily to a specific folder 'Latest Review,' and at the same time always wishes to move another file from the 'Latest Review' folder to anther 'Previous Reviews' folder. The user may define a macro with multiple steps, wherein a selected document is always uploaded to a first directory, and a second document (defined by creation data, author, format, or any of a number of document parameters) is deleted from the first directory and moved to a second directory. Thus, the operational convenience to the user is greatly increased.

When the user clicks the 'Save' button shown in FIG. 3B, the user may register the selected application functionality. Alternatively, when the user clicks the 'Delete' button, the user may unselect (i.e. remove) the selected application functionality.

This second screen may be provided to the user after the first screen of the registration user interface (such as the screen shown in FIG. 3A) is provided to the user for registration of the specific user. Thus, the selected application functionalities are registered in connection with the user registration of the specific user. In the case of FIGS. 3A and 3B, for example, the application functionalities named 'Patient Medical Records', 'Patient Billing Records,' and 'Pathology Test Results' will be registered in connection with the user registration of the specific username "John.Smith."

Returning to FIG. 2, the user information maintenance part 27b is configured to maintain user information for the specific user. In particular, the user information includes functionalities information indicating the specific application functionalities which may have been selected by the specific user (via the registration user interface depicted in FIG. 3B, for example), and which are now registered for the specific user by the user information maintenance part 27b.

FIG. 4A shows an example of user information for each one of a plurality of specific users, such as users of client terminals 12-1 through 12-4. The user information includes a plurality of usernames (representing the users of the plurality of client terminals), and functionalities information indicating the specific application functionalities registered for the specific usernames.

For example, for the username John.Smith, the corresponding functionalities information identifies application functionalities that include the macros named 'Patient Medical Records', 'Patient Billing Records', and 'Pathology Test Results'. Similarly, for the username Jane.Doe, the corresponding functionalities information identifies application functionalities that include search functions named 'Discovery Material', 'Petitions & Briefs', and 'Invoices'. The functionalities information need not simply list the name and type of the application functionality (as depicted in FIG. 4A in the interests of clarity), but may further include all information pertaining to the application functionality, such as the defined steps of a macro, how a macro button is to be visually presented, etc. . . . .

It should be apparent that the user information is not limited to that shown in FIG. 4A, which merely presents an example. In particular, while the user information shown FIG. 4A includes usernames and functionalities information, the user information can instead (or in addition) store various other information, including information that may be used to identify a user of a client terminal that may be in communication with a document management apparatus. For example, the user information can include a plurality of names and/or screen names, email addresses, telephone numbers, facsimile numbers, etc. The user information may include biometric information (such as fingerprints, palm prints, voice or speech, retinas or irises, facial expressions or features, signature, etc).

The application operations part 27c of the document access apparatus 27 is configured to access, upon login by the specific user in a later operations session, the user information of the specific user, and retrieve the functionalities information indicating the specific application functionalities registered for the specific user.

For example, if the user John.Smith logs into document access apparatus 27, then the document access apparatus accesses the user information as depicted in FIG. 4A and retrieves the functionalities information indicting the application functionalities registered for John.Smith; specifically, the macros 'Patient Medical Records', 'Patient Billing Records', and 'Pathology Test Results.'

The application operations part 27c is also configured to provide in this later operations session an operations user interface for display on a client terminal for the specific user to view. The operations user interface shows the retrieved functionalities information indicating the specific application functionalities for the specific user, or simply shows command buttons corresponding to the application functionalities. The operations user interface may be provided by the document access apparatus 27 as a web service through the network 11 to one of the client terminals 12-1 through 12-4.

Figure 5:
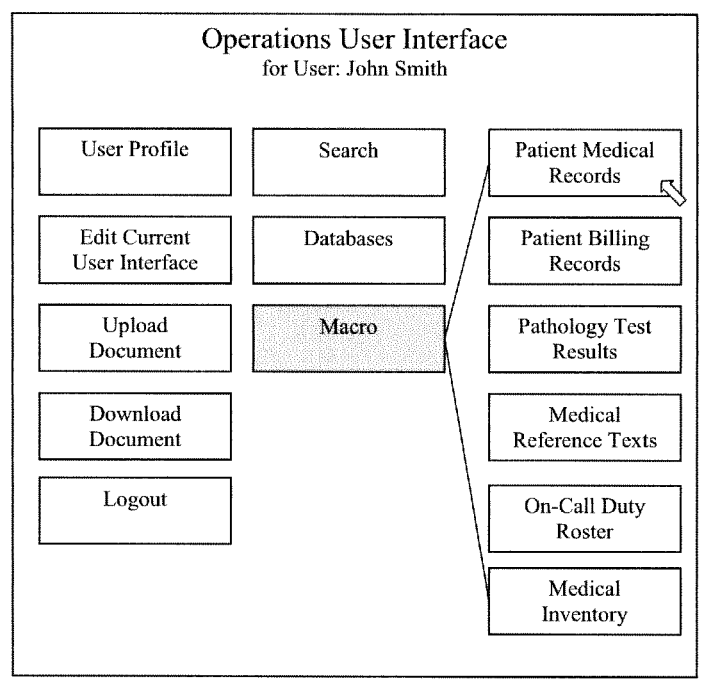
FIG. 5 shows an example of a screen of an operations user interface.

An example of an operations user interface, provided by the application operations part 27c upon login of a specific user in a later operations session, is depicted in FIG. 5. It will be seen that the operations user interface includes commands indicating specific application functionalities for the specific user that has logged in.

For example, this operations user interface may correspond to the specific username John.Smith, who was registered via the registration user interface depicted in FIG. 3A. This operations user interface also depicts the application functionalities that were registered for the specific user in FIG. 3B, including the 'Patient Medical Records' macro, the 'Patient Billing Records' Macro, and the 'Pathology Test Results' macro. The operations user interface further includes many other application functionalities that may have been registered for the username John.Smith. These include the macros 'Medical Reference Texts', 'On-Call Duty Roster' and 'Medical Inventory, as well as application functionalities to upload a document, download a document, perform a search function, access specific databases, and so forth. It should be understood that such functionality options are merely exemplary, and these options may be customized for each user according to this disclosure. Further, it can be seen that even the layout, background, button sizes, etc. . . . for the operations user interfaces is entirely customizable.

As stated above, the 'Patient Medical Records' macro corresponds to the macro that was selected and registered by the username John.Smith in FIG. 3B. Thus, when the user John Smith selects a document and then selects the macro 'Patient Medical Records', the selected document will be uploaded directly to the specified directory address. The user John Smith may perform this operation selecting and dragging an icon of the document from a desktop display over the 'Patient Medical Records' macro button, for example.

Thus, according to this exemplary embodiment of the present invention, there is provided the tools for the efficient exchange and management of documents and files, and for streamlining access in a document management system. Whereas conventional techniques typically only provide a single interface for all users of a document management system, which forces users to perform cumbersome onscreen navigation through an explorer type interface—and drill down through many hierarchical directory levels—every time a user wishes to access a document, the system of the present application resisters selected application functionalities (including customized macros and search functions) of a specific user in a registration session, and provides an operations user interface showing the specific application functionalities upon login of the specific user. Hence, the operational convenience to users of the present invention is greatly increased.

The document access apparatus 27 may be embodied as a server that is distinct from the document management apparatus 25. In this way, the document access apparatus 27 may correspond to a first server, and the document management apparatus 25 may correspond to a second server separate and distinct from the first server. Hence, while conventional document management systems typically have an integrated user interface, such that any modification of the user interface would require taking the document management system offline, the document access apparatus 27 of this disclosure is configured for modification without taking the document management apparatus 25 offline.

Figure 6:
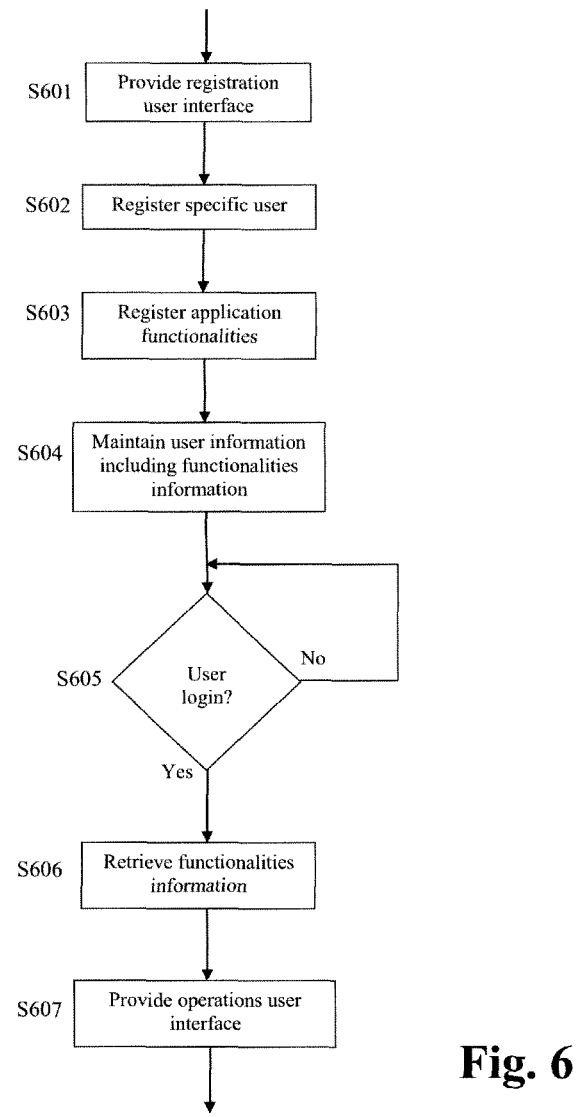
FIG. 6 shows an example of a workflow on a document access apparatus (or application user interface apparatus) side.

In FIG. 6, there is shown an example of a workflow on a document access apparatus side, such as the document access apparatus 27 in FIG. 2.

Firstly, a registration user interface is provided by the document access apparatus to a specific user at a terminal (S601).

In S602, the registration user interface registers the specific user in a registration session.

Further, the registration user interface is configured to allow user selection of specific ones of a plurality of application functionalities of a document management apparatus for the specific user. In S603, the registration user interface registers the selected application functionalities in connection with the user registration.

In S604, the document access apparatus maintains user information for the specific user, the user information including functionalities information indicating the specific application functionalities registered for the specific user.

Then, in S605, the document access apparatus determines if the specific user has logged into the document access apparatus in an operations session.

If it is determined that the specific user has not logged in (S605, no), then the workflow returns to S605 and the document access apparatus again determines if the specific user has logged in, in an operations session. If it is determined that the specific user has logged in (S605, yes) then the document access apparatus retrieves the functionalities information indicating the specific application functionalities registered for the specific user (S606). In S607, an operations user interface is provided to the specific user, where the operations user interface shows the retrieved functionalities information indicating the specific application functionalities for the specific user.

According to another aspect of this disclosure, the user information may also include business relevancy information indicating a specific business relevancy field pertinent to the registered user, such as Medical for username "John.Smith" and Legal for username Jane.Doe. An example of user information that includes such business relevancy information is depicted in FIG. 4B. (The user information in FIG. 4B may also include the functionalities information as shown in FIG. 4A, although the functionalities information is omitted in the interests of clarity). When the operations user interface receives user authentication information during the login of the specific user, the operations user interface may utilize the user authentication information to retrieve the business relevancy information of the specific user, and present information corresponding to the specific business relevancy field pertinent to the specific user and indicated by the retrieved business relevancy information of the specific user. Such information may include news, updates and bulletins for the specific business relevancy field, for example.

The operations user interface may also provide user interface application functionalities corresponding to the specific business relevancy field pertinent to the specific user (and not other application functionalities that are unrelated to the specific business relevancy field). These application functionalities may include common or popular business relevancy field-related search functions and macros, and activators to access these application functionalities. The user information may include user interface information, as depicted in FIG. 4B, that specifies these application functionalities that correspond to a particular business relevancy field.

According to another aspect of this disclosure, after the specific user selects and registers the specific application functionalities of the document management apparatus (during the registration session via the registration user interface), the registration user interface provides a tentative view of the operations user interface including the selected application functionalities, in order for the specific user to determine if their operations user interface is satisfactory.

For example, the registration user interface may provide a screen showing the operations user interface depicted in FIG. 5, as well as a prompt that requests confirmation that the specific user is satisfied with the aspects of the operations user interface (including the selected application functionalities). If the specific user confirms, then the operations user interface including the selected application functionalities is to be provided when the specific user logins in during a later operations session, and the registration session may end.

If the user does not confirm, then after the view of the operations user interface is displayed, the registration user interface allows the user to unselect one or more of the selected application functionalities, and the registration user interface provides an updated view of the operations user interface without the unselected application functionality. For example, if the user does not confirm, then the document access apparatus may provide the registration user interface screen B shown in FIG. 3B. The user may click on the 'Delete' button for any of the application functionalities to unselect that application functionality. Thereafter, the registration user interface again shows an operations user interface (such as that depicted in FIG. 5), this time without the unselected application functionalities, and the registration user interface again requests confirmation that the specific user is satisfied with the aspects of the operations user interface.

Thus, although not shown in FIG. 4A, the user information maintained by the user information maintenance part for the specific user includes all the user interface information required for generating the confirmed operations user interface (including the selected application functionalities) when the specific user logins in during a later operations session.

According to another aspect of this disclosure, one of the application functionalities selected by the specific user through the registration user interface may be registered in correspondence with one or more document parameters and/or one or more document types.

Document parameters include one of many parameters pertaining to a document, such as document name, size, author, creation date, modification date, file format, directory location, and so forth. The document type may be one of many types of documents, such as a memorandum, invoice, resume, sales document, and so forth.

With reference to FIG. 7A, there is depicted a registration user interface for selecting and registering application functionalities, similar to the registration user interface depicted in FIG. 3B. The application functionalities selected and registered in FIG. 7A include search functions named 'Invoices', 'Discovery Material' and 'Petitions and Briefs'. It will be seen that the Search:Invoices application functionality is registered with only one selected document type, an invoice document type. Further, it may be seen that the user has selected a subset of document parameters with respect to this search function ('Date Created', 'Author', 'Directory' and 'Format'), and these document parameters are registered for this search function. The document type and document parameters may be selected using pull-down option menus, for example.

Figure 7B:
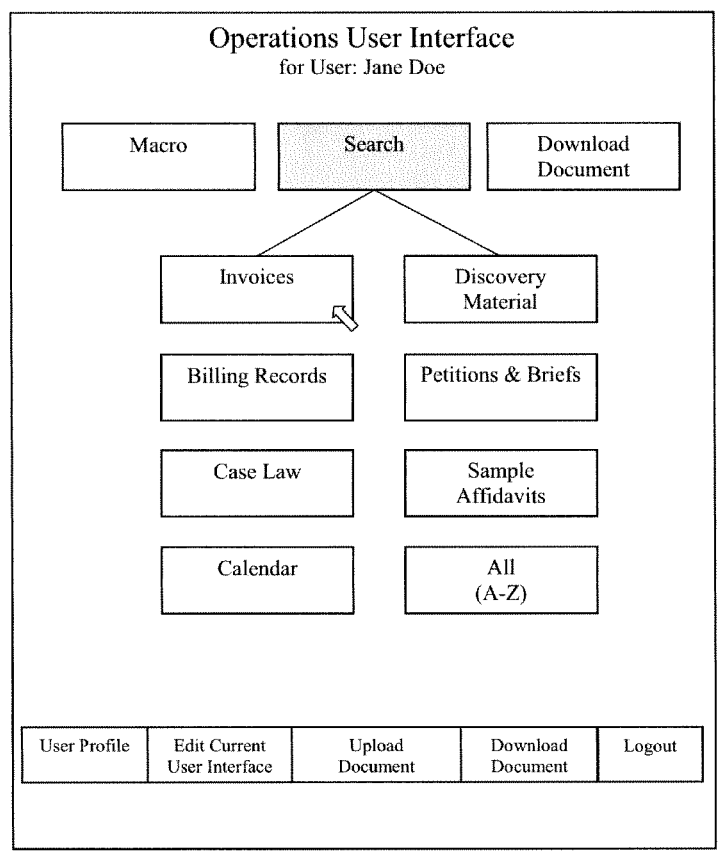

FIG. 7B depicts an example of an operations user interface that may be provided based on these registered search functions, which includes specific commands for the 'Invoices' search function and other application functionalities. If the user selects the Invoices command, then the corresponding registered search function will be presented, as depicted in FIG. 7C. This search function is provided along with the document type and the one or more document parameters that were registered with the search function. The user can edit the fields such as 'Last 24 Hours' or 'John.Smith' as necessary, or remove one of the document parameters entirely. In this example of FIGS. 7A-7C, this 'Invoices' search function allows the user Jane Doe to search for all Invoices in Word format that have been created in the last 24 hours by the user John Smith, stored in the directory g://XYZ//updates/. The user Jane Doe may now regularly check for this type of data with minimal effort.

Thus, according to an aspect of this disclosure, at least one of the application functionalities selected through the user registration part is registered with a document type and/or document parameter selected during the registration session and registered for the selected application functionality, and the application functionality is provided in the operations user interface when the specific user logins in the later operations session, along with the document type and/or document parameter registered for the application functionality, and not including other document types/parameters in the document management apparatus that were not registered for the application functionality.

Similarly, in another aspect, the operations user interface includes a search part, and during the registration session, the registration user interface permits selection of a subset, less than all, of document parameters in the document management apparatus, and the subset of selected document parameters are registered for the search part, and the search part of the operations user interface provided when the specific user logins in the later operations session allows for user selection from the registered document parameters, and not from other document parameters in the document management apparatus that were not registered for the search part.

Although FIGS. 7A through 7C depict both a document type and document parameters being registered for an application functionality, it should be understood that document types may be registered for an application functionality without registering any document parameters, and vice versa. On the other hand, it may be possible to configure a document management apparatus so that some document parameters of a document may be dependent upon the document type of the document. For example, if the document type is an invoice, then the document parameters may be vendor name, invoice number, invoice amount, and other parameters that are specific to this document type and functionally related to this document type.

Figure 8:
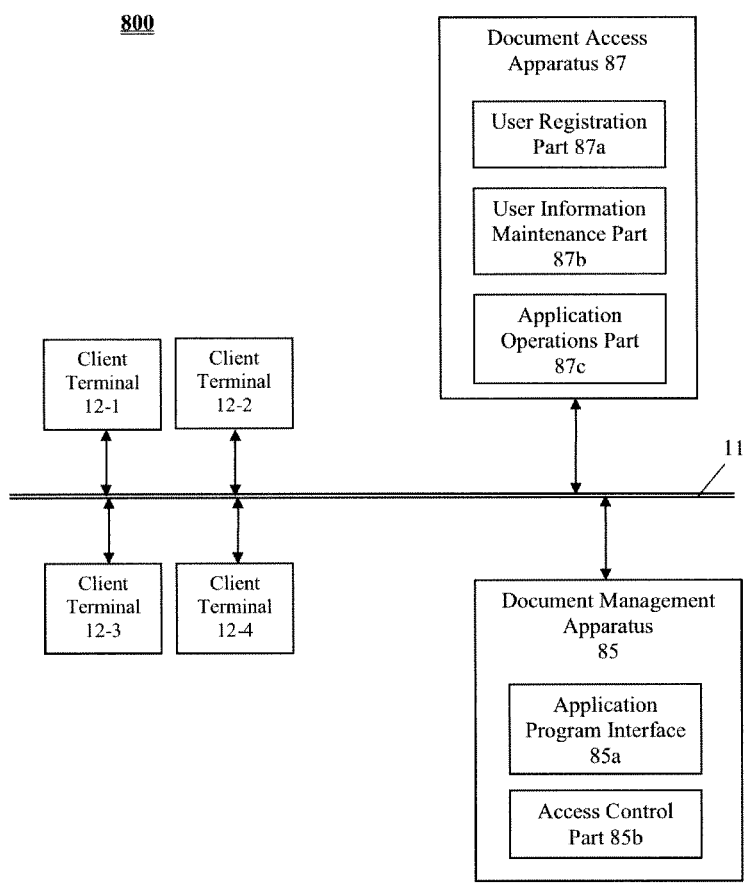
FIG. 8 shows a block diagram of a system, according to another exemplary embodiment of this disclosure.

Turning now to FIG. 8, there is shown schematically a system 800 for streamlining access in a document management system, according to another exemplary embodiment of this disclosure.

System 800 includes a plurality of client terminals 12-1 through 12-4, a document management apparatus 85, and a document access apparatus 87.

The plurality of client terminals 12-1 through 12-4 may be substantially similar to those of FIG. 2.

The document management apparatus 85 may be substantially similar to the document management apparatus 25 of FIG. 2. However, the document management apparatus 85 further includes an application program interface 85a and an access control part 85b. The application program interface 85a is configured to specify a format of communication with the document management apparatus 85.

The application program interface 85a is similar to the application programming interfaces (APIs) known in the art, which are interfaces often implemented in software that specify the commands and instructions that an application or device may be configured to accept. In this way, the application program interface 85a of the document management apparatus 85 may include specifications for routines and protocols that are to be used when communicating with the document management apparatus 85 or requesting the application functionalities of the document management apparatus (such as uploading, accessing and downloading documents).

The document access apparatus 87 is similar to the document access apparatus 27 of FIG. 2. Further, the document access apparatus 87 is configured to communicate with the application program interface 85a of the document management apparatus 85, when user input is received at the operations user interface of the document access apparatus 87. The user input through the operations user interface may be, for example, request to upload/download a document to/from the document management apparatus, or a request to access some other application functionality of the document management apparatus. The document access apparatus is also configured to send a command, corresponding to the user input and acceptable to the document management apparatus 85, to the document management apparatus to access one or more corresponding application functionalities of the document management apparatus.

Specifically, when the document access apparatus 87 communicates with the application program interface 85a of the document management apparatus 85, the document access apparatus determines a set of possible instructions that the document management apparatus is able to accept. Based on this set of possible instructions, the document access apparatus prepares a command or set of commands corresponding to the user input that the document management apparatus is able to accept, and transmits this command to the document management apparatus.

For example, if the user input is a request to download all instances of a certain type of document (such as a spreadsheet or a presentation document) that is known to be associated with a certain file format (such as .xml or .ppt), then the document access apparatus communicates with the application program interface 85a of the document management apparatus 85, in order to determine the protocols for requesting documents of a specific file format from the document management apparatus. The document access apparatus can then prepare and transmit the appropriate command that is acceptable to the document management apparatus.

The document access apparatus is also configured to receive at least one document or other piece of information from the application program interface 85a of the document management apparatus 85, in response to the command transmitted from the document access apparatus to the document management apparatus 85. Following this, the operations user interface provides the document or other information for access by the specific user.

Thus, the document access apparatus 87 of this disclosure has the capacity to receive user input from one of a plurality of user interfaces, and send a command corresponding to the user input to a document management apparatus to access an application functionality of the document management apparatus, where the command is prepared so as to be acceptable to the document management apparatus. Since the document access apparatus 87 prepares the command by communicating with an application program interface 85a of a document management apparatus 85, the document access apparatus becomes highly flexible and has the capacity to communicate with a plurality of different document management apparatuses.

In particular, the application functionalities selected through the user registration part 87a, during the registration of the specific user in the registration session, may include specific commands for the specific user to later select (via the operations user interface during a later operations session) for transmission to an application program interface 85a of the document management apparatus 85.

The access control part 85b of the document management apparatus is configured to maintain, for each registered user, access control information indicating portions of documents and document data in a document database that the registered user is authorized to access.

FIG. 9 depicts an example of access control information, which may be maintained by the access control part 85b of the document management apparatus 85. The access control information identifies a plurality of registered users of the document management apparatus 85, and the corresponding access control list of documents or data that the user is authorized to access. For example, the registered user John.Smith is permitted to access the documents 'A', 'B' and 'C', the registered user Jane.Doe is permitted to access the documents 'A', 'B', 'C' and 'D', the registered user Jeffrey.Oscar is permitted to access the documents 'B', 'D', 'F' and 'G', and so on.

While this discussion of the access control information refers to documents, the access control information can of course relate to other types of information that the specific user is authorized to access, such as the databases to which the specific user has access privileges, or application functionalities to which the specific user has access privileges. Therefore, the application functionalities selected through the user registration part (via a registration user interface during a registration session) may include access to a plurality of databases to which the specific user has access privileges, where the databases to which the specific user has access privileges are defined in the access control information. The access control information may be set by a systems administrator or manager, for example.

When a command selected by the specific user (via the operations user interface in a later operations session) is transmitted to the application program interface 85a of the document management apparatus 85, the document management apparatus only applies the command to the documents and document data to which the specific user is authorized to access.

For example, if the command selected by the specific user 'John.Smith' is a command to download a document 'H' from the document management apparatus 85, then the document management apparatus 85 will not apply the command to the document 'H', since the access control information in the example of FIG. 9 indicates that the user John.Smith is not authorized to access the document 'H'. On the other hand if the command selected by the specific user 'John.Smith' is a command to download a document 'C' from the document management apparatus 85, then the document management apparatus 85 will apply the command to the document 'C', since the access control information in the example of FIG. 9 indicates that the user John.Smith is authorized to access the document 'C'.

Figure 10A:
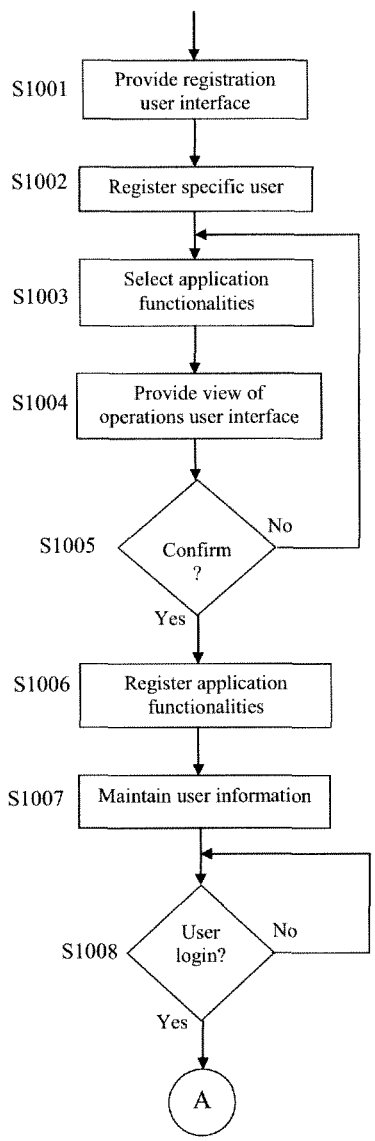
FIGS. 10A and 10B show an example of a more detailed workflow on a document access apparatus (or application user interface apparatus) side.
Figure 10B:
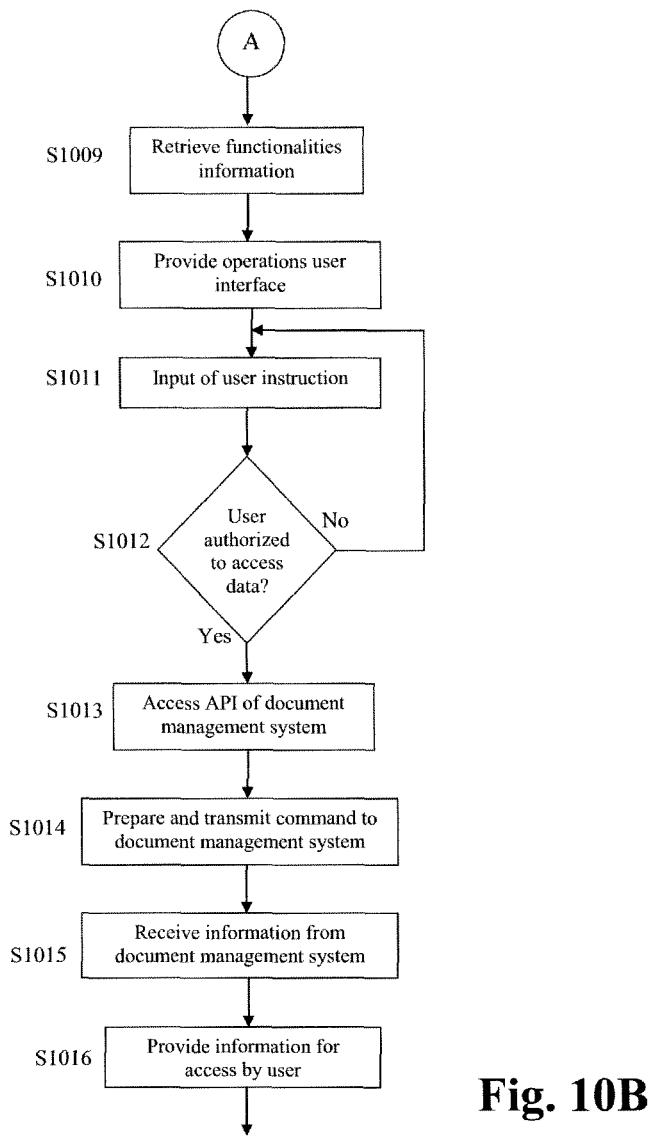

In FIGS. 10A and 10B, a flow chart is shown illustrating an example of a more detailed workflow on a document access apparatus side (such as the document access apparatus 87 in FIG. 8).

Firstly, a registration user interface is provided by the document access apparatus to a specific user at a terminal (S1001).

In S1002, the registration user interface registers the specific user in a registration session. Then in S1003, the user selects (or unselects) specific ones of a plurality of application functionalities of a document management apparatus, via the registration user interface.

In S1004 the registration user interface provides a view of an operations user interface, including the selected application functionalities, to the specific user. Also provided is a request to confirm that the operations user interface including the selected application functionalities is to be provided when the specific user logs in a later operations session.

If the user does not confirm (S1005, no), then the workflow returns to S1003, and the user is able to select/unselect application functionalities of the document management apparatus; the registration user interface provides an updated view of the operations user interface (with the selected application functionalities and without the unselected application functionalities) in S1004, as well as another request to confirm that the operations user interface is to be provided when the specific user logins in the later operations session.

If the user confirms (S1005, yes), then the registration user interface registers the selected application functionalities in connection with the user registration, in S1006. In S1007, the document access apparatus maintains user information for the specific user, the user information including functionalities information indicating the specific application functionalities registered for the specific user. Then, in S1008, the document access apparatus determines if the specific user has logged into the document access apparatus in an operations session.

If it is determined that the specific user has not logged in (S1008, no), then the workflow returns to S1008 and the document access apparatus again determines if the specific user has logged into an operations session.

If it is determined that the specific user has logged in (S1008, yes) then the document access apparatus retrieves the functionalities information indicating the specific application functionalities registered for the specific user, in S1009.

In S1010, an operations user interface is provided to the specific user, where the operations user interface shows the retrieved functionalities information indicating the specific application functionalities for the specific user.

After providing the operations user interface for display to the user (S1010), the user may input an instruction requesting the document access apparatus and/or document management apparatus to perform a particular operation, in S1011. For example, the user may issue an instruction for the document access apparatus to upload a particular document or file to the document management apparatus. The user may also input a specific command corresponding to one of the application functionalities, including a specified macro.

In S1012, the document access apparatus determines if the user has access privileges or authorization to access the document data to which the instruction pertains, based on access control information. If the document access apparatus determines that the user is not authorized to access the document data (s1012, no), then the workflow returns to S1011 and the user may input another instruction.

If the document access apparatus determines that the user is authorized to access the document data (s1012, yes), then document access apparatus accesses the application program interface (API) of the document management apparatus in order to determine the set of possible instructions that the document management apparatus is able to accept (S1013). In S1014, the document access apparatus determines the appropriate command to be issued to the document management apparatus, based on the user instructions input in S1011 and the set of possible instructions determined in S1013. In this way, the document access apparatus may convert the user instruction into a command that the document management apparatus is able to accept. For example, the document access apparatus may convert an instruction for a particular medical document into a request for files with an attribute that the document management apparatus can process. The document access apparatus also transmits the command to the document management apparatus in S1014.

In S1015 the document access apparatus receives from the document management apparatus the image data of a document or some other information, in response to the command transmitted in S1014.

After receiving the document or other information in S1015, the document access apparatus provides the document or other information received from the document management apparatus to the logged-in user, via the operations user interface (S1016).

Although not shown, the document access apparatus may also determine, between S1003 and S1004, if the application functionalities selected by the specific user pertains to documents, document data, application functionalities or databases to which the specific user has access privileges. The document access apparatus may make this determination based on access control information (which may be set at some point in time by a system administrator, for example). If the document access apparatus determines that the user does not have access privileges with respect to the selected application functionality, then an error message may be displayed and the workflow may be prevented from proceeding to S1001 or beyond.

While the examples shown in FIG. 2 and FIG. 8 include one document management apparatus, one document access apparatus and four client terminals 12-1 through 12-4, it should be appreciated that such numbers of systems, servers, apparatuses and terminals are arbitrary and are selected as an example in order to facilitate discussion, and that the subject matter of this disclosure can be implemented in a system including one or more systems, servers, apparatuses and terminals. Further, it is noted that a document access apparatus and terminal can be included in one integrated device (or of course can be separate devices). Other devices, such as scanners, printers and multi-function devices (MFDs) may also be connected to the network 11, as is well known in the art.

Each of the client terminals 12-1 through 12-4 can be any computing device, including but not limited to a personal, notebook or workstation computer, a kiosk, a FDA (personal digital assistant), a MFD (multi-function device), a server, a mobile phone or handset, another information terminal, etc., that can communicate through the network 11 with other devices.

While four client terminals 12-1 through 12-4 are depicted in each of FIG. 2 and FIG. 8, it should be understood that system 200 and 800 can include any number of client terminals (which can have similar or different configurations) connected to the network 11.

The document access apparatus 27 (and 87) can be configured in software or hosted on any computing device, including but not limited to a personal, notebook or workstation computer, a kiosk, a PDA (personal digital assistant), a MFD, a server, a mobile phone or handset, another information terminal, etc., that can communicate through the network 11 with other devices.

The document access apparatus 27 (and 87) of this disclosure may be realized by a computer program product including a computer-usable, non-transient medium (such as a disk storage apparatus) having instructions tangibly embodied therein that are executed by a computer.

Thus, it should be understood that document access apparatus 27 (and 87) may be executed on a computer. While document access apparatus 27 (and 87) are shown as being external to the client terminals 12-1 through 12-4, the document access apparatus 27 (and 87) may in fact be executed on one of the client terminals 12-1 through 12-4.

The document management apparatus may include a data store that can comprise one or more structural or functional parts that have or support a storage function. For example, the data store can be, or can be a component of, a source of electronic data, such as a document access apparatus, a back-end server connected to a document access apparatus, an e-mail server, a file server, a multi-function peripheral device (MFP or MFD), a voice data server, an application server, a computer, a network apparatus, a terminal etc. It should be appreciated that the term "electronic document" or "electronic data", as used herein, in its broadest sense, can comprise any data that a user may wish to access, retrieve, review, etc.

The network 11 can include one or more of a secure intranet or extranet local area network, a wide area network, any type of network that allows secure access, etc., or a combination thereof. Further, other secure communications links (such as a virtual private network, a wireless link, etc.) may be used as well in the network 11. In addition, the network 1 preferably uses TCP/IP (Transmission Control Protocol/Internet Protocol), but other protocols can also be used. How devices can connect to and communicate over the network 11 is well-known in the art and is discussed for example, in "How Networks Work", by Frank J. Derfler, Jr. and Les Freed (Que Corporation 2000) and "How Computers Work", by Ron White, (Que Corporation 1999), the entire contents of each of which are incorporated herein by reference.

Figure 11:
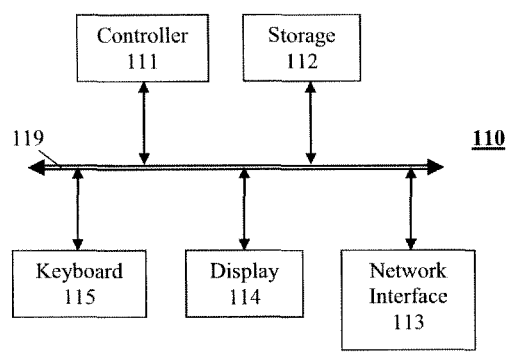
FIG. 11 shows a block diagram of an exemplary configuration of a document access apparatus (or application user interface apparatus)

FIG. 11 shows an exemplary constitution of a document access apparatus 110 as a computer, for example, that can be configured through software to provide the document access apparatus 27 of FIG. 2 (or document access apparatus 87 of FIG. 8). As shown in FIG. 11, the document access apparatus 110 includes a controller (or central processing unit) 111 that communicates with a number of other components, including memory or storage part 112, network interface 113, display 114 and keyboard 115, by way of a system bus 119.

The document access apparatus 110 may be a special-purpose device (such as including one or more application specific integrated circuits or an appropriate network of conventional component circuits) or it may be software-configured on a conventional personal computer or computer workstation with sufficient memory, processing and communication capabilities to operate as a terminal and/or server, as will be appreciated to those skilled in the relevant arts.

In document access apparatus 110, the controller 111 executes program code instructions that control conferencing apparatus operations. The controller 111, memory/storage 112, network interface 113, display 114 and keyboard 115 are conventional, and therefore in order to avoid occluding the inventive aspects of this disclosure, such conventional aspects will not be discussed in detail herein.

The document access apparatus 110 includes the network interface 113 for communications through a network, such as communications through the network 11 with the client terminals 12-1 through 12-4 and document management apparatus 25 in FIG. 2. However, it should be appreciated that the subject matter of this disclosure is not limited to such configuration. For example, the document access apparatus may communicate with the client terminals 12-1 through 12-4 and document management apparatus 25 through direct connections and/or through a network to which some components are not connected. As another example, the document access apparatus need not be provided by a server that services terminals, but rather may communicate with the terminals on a peer basis, or in another fashion.

As mentioned above, document access apparatus 27 (and 87) are not limited to a server or computer, but can be manifested in any of various devices that can be configured to communicate over a network and/or the Internet.

Note that one or more of the user interfaces (such as the registration user interface or the operations user interface) may be provided as web services through the network to the client terminal.

Figure 12:
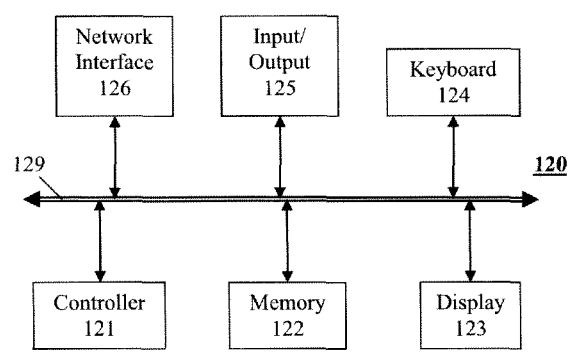
FIG. 12 shows a block diagram of an exemplary configuration of a client terminal.

An example of a configuration of one of the plurality of client terminals 12-1 through 12-4 (for example, as a computer) is shown schematically in FIG. 12. In FIG. 12, computer 120 includes a controller (or central processing unit) 121 that communicates with a number of other components, including memory 122, display 123, keyboard (and/or keypad) 124, other input/output (such as mouse, touchpad, stylus, microphone and/or speaker with voice/speech interface and/or recognition software, etc.) 125, and network interface 126, by way of internal bus 129.

The memory 122 can provide storage for program and data, and may include a combination of assorted conventional storage devices such as buffers, registers and memories [for example, read-only memory (ROM), programmable ROM (PROM), erasable PROM (EPROM), electrically erasable PROM (EEPROM), static random access memory (SRAM), dynamic random access memory (DRAM), non-volatile random access memory (NOVRAM), etc.].

The network interface 126 provides a connection (for example, by way of an Ethernet connection or other network connection which supports any desired network protocol such as, but not limited to TCP/IP, IPX, IPX/SPX, or NetBEUI) to network 11.

A user interface is provided and is configured through software natively or received through a network connection, to allow the user to access electronic data or content on the client terminal and/or via the network, interact with network-connected devices and services (such as the document management apparatus 25), enjoy other software-driven functionalities, etc. For example, a browser (such as Internet Explorer™, Netscape Navigator™, a proprietary browser, etc.) may be provided on the client terminal so that a user of the client terminal can use browsing operations to communicate with the document management apparatus 25, and access other data or content.

Additional aspects or components of the computer 120 are conventional (unless otherwise discussed herein), and in the interest of clarity and brevity are not discussed in detail herein. Such aspects and components are discussed, for example, in "How Computers Work", by Ron White (Que Corporation 1999), and "How Networks Work", by Frank J. Derfler, Jr. and Les Freed (Que Corporation 2000), the entire contents of each of which are incorporated herein by reference.

As mentioned above, each of the client terminals 12-1 through 12-4 is not limited to a personal computer, but can be manifested in a form of any of various devices that can be configured to communicate over a network and/or the Internet.

Figure 13:
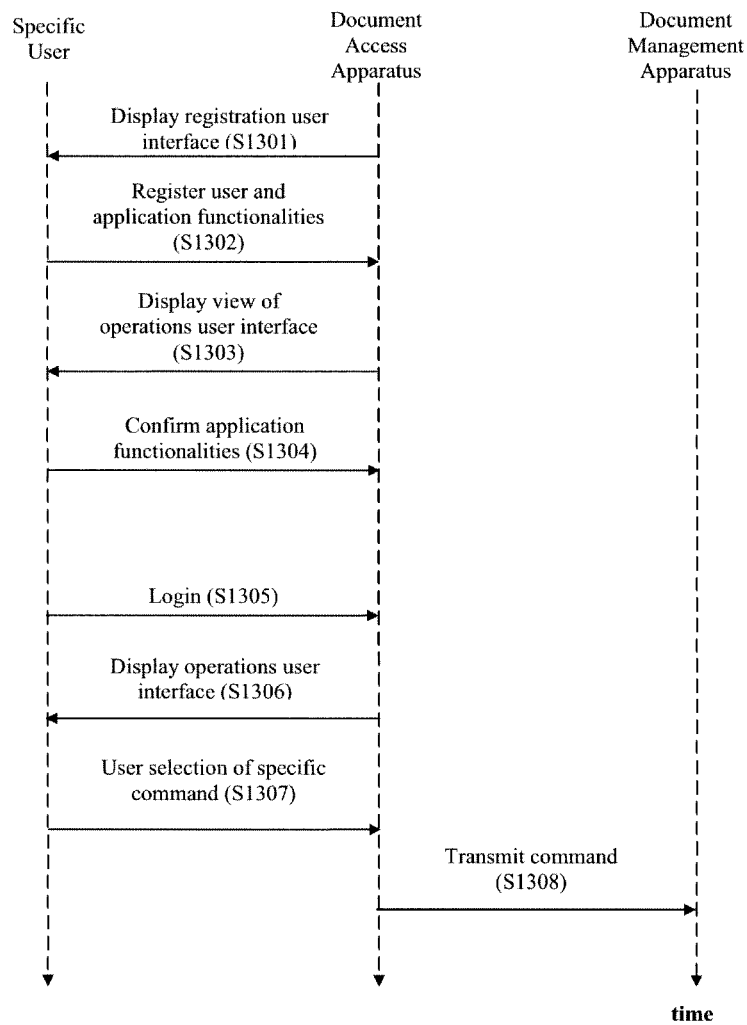
FIG. 13 shows a schematic view of an example of a data flow in an exemplary embodiment.

Turning now to FIG. 13, a schematic view of an example of data flow in an exemplary embodiment is presented.

Firstly, at the start of a registration session, a registration user interface is provided by a document access apparatus to a specific user at a terminal. (S1301). The registration user interface is provided for registration of a specific user during the registration session. Moreover, the registration user interface is provided for selection of specific ones of a plurality of application functionalities of a document management apparatus for the specific user, and for registration of the selected application functionalities in connection with the user registration.

In S1302, information is transmitted back to the document access apparatus, the information pertaining to the registration of the specific user, and registration of the specific ones of the application functionalities of the document management apparatus selected by the specific user.

In S1303, a view of an operations user interface including the selected application functionalities is provided to the specific user, as well as a request to confirm that the operations user interface including the selected application functionalities is to be provided when the specific user logs in into a later operations session.

When the view of the operations user interface is displayed, the registration user interface allows the user to unselect one or more of the selected application functionalities, and the registration user interface provides an updated view of the operations user interface without the unselected application functionality, as well as another request to confirm that the operations user interface including the selected application functionalities is to be provided when the specific user logins in the later operations session.

In S1304, a confirmation is transmitted back to the document access apparatus, confirming that the operations user interface including the selected application functionalities is to be provided when the specific user logins in the later operations session.

As result, user information including functionalities information indicating the specific application functionalities registered for the specific user, is maintained by the document access apparatus for the specific user. This point may mark the end of the registration session that commenced at or before S1301.

Then, at a later time in S1305, the specific user logs into the document access apparatus, in a later operations session. Upon login by the specific user in S1305, the maintained functionalities information indicating the specific application functionalities registered for the specific user is retrieved.

In S1306, an operations user interface is provided to the specific user, where the operations user interface shows the retrieved functionalities information indicating the specific application functionalities for the specific user.

In S1307, the user may enter a specific command in the operations user interface, the specific command being selected for transmission from the document access apparatus to an application program interface of a document management apparatus.

Finally, in S1308, the specific command is transmitted from the document access apparatus to the application program interface of a document management apparatus.

The above-mentioned specific embodiments are illustrative, and many variations can be introduced on these embodiments without departing from the spirit of the disclosure or from the scope of the appended claims. For example, elements and/or features of different examples and illustrative embodiments may be combined with each other and/or substituted for each other within the scope of this disclosure and appended claims.

What is claimed is:

1. A document access apparatus for streamlining access to a document management application in a document management system, said document access apparatus comprising a processor and a non-transitory storage medium storing one or more programs of instructions executable by the processor, said programs of instructions, when executed by the processor, configuring the document access apparatus to include:
    a user registration part configured to provide a registration user interface for registration of a specific user in a registration session, and selection, by the specific user, of specific ones of a plurality of application functionalities of a document management apparatus, to be performed in response to request of the specific user in a later operations session, and register the selected application functionalities along with, for each one of the selected application functionalities, one or more user-specified parameters specified by the specific user in connection with the user registration;
    a user information maintenance part configured to maintain, for the specific user, user information including functionalities information indicating the specific application functionalities registered by the user information maintenance part for the specific user; and
    an application operations part configured to retrieve upon login by the specific user in the later operations session, the functionalities information indicating the specific application functionalities registered for the specific user, and provide in the later session an operations user interface configured to receive from the specific user the request to perform a selected application functionality amongst the specific application functionalities registered for the specific user, causing the document access apparatus to access the selected application functionality amongst the specific application functionalities registered for the specific user,
    wherein the application operations part displays the user-specified parameters selected during the registration session for the selected application functionality via the operations user interface, before performing the selected application functionality on a basis of the user-specified parameters.

2. The document access apparatus of claim 1, wherein during the registration session, the registration user interface provides a view of the operations user interface including the selected application functionalities, and requests confirmation that the operations user interface including the selected application functionalities is to he provided when the specific user logins in the later operations session.

3. The document access apparatus of claim 2, wherein after the view of the operations user interface is displayed, the registration user interface allows the user to unselect one or more of the selected application functionalities, and the registration user interface provides an updated view of the operations user interface without the unselected application functionality.

4. The document access apparatus of claim 2, wherein the user information maintained by the user information maintenance part for the specific user includes UI information for generating the confirmed operations user interface including the selected application functionalities when the specific user logins in the later operations session.

5. The document access apparatus of claim 1, wherein st one of the application functionalities selected through the user registration part include one or more document parameters, other than document name, selected during the registration session and registered for the selected application functionality, and the application functionality is provided in the operations user interface when the specific user logins in the later operations session, along with the one or more document parameters registered for the application functionality, and not including other document parameters in the document management apparatus that were not registered for the application functionality.

6. The document access apparatus of claim 1, wherein
    the operations user interface includes a search part,
    during the registration session, the registration user interface permits selection of a subset, less than all, of document parameters in the document management apparatus, and the subset of selected document parameters are registered for the search part, and
    the search part of the operations user interface provided when the specific user logins in the later operations session allows for user selection from the registered document parameters, and not from other document parameters in the document management apparatus that were not registered for the search part.

7. The document access apparatus of claim 1, wherein at least one of the application functionalities selected through the user registration part is registered with only document types selected during the registration session, and the application functionality is provided in the operations user interface when the specific user logins in the later operations session, along with the document types registered for the application functionality, and not including other document types in the document management apparatus that were not registered for the application functionality.

8. The document access apparatus of claim 1, wherein the application functionalities selected through the user registration part during the registration of the specific user in the registration session include specific commands for the specific user to select for transmission to an application program interface of the document management apparatus.

9. The document access apparatus of claim 1, wherein the application functionalities selected through the user registration part include a plurality of databases to which the specific user has access privileges.

10. The document access apparatus of claim 1, wherein
    the user information maintained by the user information maintenance part for the specific user includes business relevancy information indicating a specific business relevancy field pertinent to the specific user, and the operations user interface (UI) is configured to receive user authentication information during the login of the specific user, utilize the user authentication information to retrieve the business relevancy information of the specific user, and present information corresponding to the specific business relevancy field pertinent to the specific user and indicated by the retrieved business relevancy information of the specific user.

11. The document access apparatus of claim 10, wherein the operations user interface (UI) provides application functionalities corresponding to the specific business relevancy field pertinent to the specific user, and does not provide other application functionalities that are unrelated to the specific business relevancy field.

12. The document access apparatus of claim 10, wherein the operations user interface (UI) includes one or more UI activators to access application functionalities corresponding to the specific business relevancy field pertinent to the specific user.

13. The document access apparatus of claim 1,
wherein one of said application functionalities registered for the specific user is a specified macro defined by the user that includes one or more operation steps to be performed in a selected sequence, and
wherein an activator corresponding to the specified macro is included in the operations user interface provided to the user upon login, the activator being configured to perform said one or more operation steps in the selected sequence when the activator is selected.

14. The document access apparatus of claim 1, wherein the application functionality is registered with a document type selected during the registration session and one or more document parameters selected during the registration session, and the application functionality is provided in the operations user interface when the specific user logins, along with the document type and the one or more document parameters registered for the application functionality, and wherein the document parameters are specific to the document type and functionally related to the document type.

15. The document access apparatus of claim 1, wherein
document management apparatus requires a first number of user inputs to he received through a user interface of the document management apparatus to access a particular one of the plurality of application functionalities, and
in a case that the particular one of the plurality of application functionalities is registered for the specific user, the document access apparatus requires a second number of user inputs to be received from the specific user through the operations user interface to access the particular one of the plurality of application functionalities of the document management apparatus, the second number being less than the first number.

16. A system for providing document management services on a terminal, said system comprising:
a document management apparatus configured to execute a document management application having a plurality of application functionalities;
an application user interface apparatus configured to communicate through a network with the document management apparatus, the application user interface apparatus including a processor and a non-transitory storage medium storing one or more programs of instructions executable by the processor, said programs of instructions, when executed by the processor, configuring the document access apparatus to include:

a user registration part configured to provide a registration user interface for registration of a specific user in a registration session, and selection, by the specific user, of specific ones of a plurality of application functionalities of a document management apparatus, to be performed in response to request of the specific user in a later operations session, and register the selected application functionalities along with, for each one of the selected application functionalities, one or more user-specified parameters specified by the specific user in connection with the user registration;
a user information maintenance part configured to maintain, for the specific user, user information including functionalities information indicating the specific application functionalities registered by the user information maintenance part for the specific user; and
an application operations part configured to retrieve upon login by the specific user in the later session, the functionalities information indicating the specific application functionalities registered for the specific user, and provide in the later session an operations user interface configured to receive from the specific user the request to perform a selected application functionality amongst the specific application functionalities registered for the specific user, causing the document access apparatus to access the selected application functionality amongst the specific application functionalities registered for the specific user,
wherein the application operations part displays the user-specified parameters selected during the registration session for the selected application functionality via the operations user interface, before performing the selected application functionality on a basis of the user-specified parameters.

17. The document management system of claim 16, wherein
the document management apparatus includes an application program interface; and
the application functionalities selected through the user registration part during the registration of the specific user in the registration session include specific commands for the specific user to select, in the later operations session, for transmission to the application program interface of the document management apparatus.

18. The document management system of claim 17, wherein
the document management apparatus includes an access control part to maintain, for each registered user, access control data indicating portions of documents and document data in a document database that the registered user is authorized to access, and
when a command selected by the specific user in the later operations session is transmitted to the application program interface of the document management apparatus, the command is applied by the document management apparatus only to the documents and document data to which the specific user is authorized to access.

19. A method for streamlining access in a document management system including an application user interface apparatus configured to communicate through a network with a document management apparatus that is configured to execute a document management application having a plurality of application functionalities, said method comprising the steps of:
(a) providing, by the application user interface apparatus in a registration session, a registration user interface for registration of a specific user and selection, by the specific user, of specific ones of a plurality of application functionalities, to be performed in response to request of the specific user in a later operations session, and register the selected application functionalities along with, for each one of the selected application functionalities, one or more user-specified parameters specified by the specific user in connection with the user registration;

(b) maintaining, by the application user interface apparatus, for the specific user, user information including functionalities information indicating the specific application functionalities registered in (a) for the specific user;

(c) retrieving upon login by the specific user in the later session, the functionalities information indicating the specific application functionalities registered in (a) for the specific user, and providing in the later session an operations user interface configured to receive from the specific user the request to perform a selected application functionality amongst the specific application functionalities registered for the specific user, causing the document access apparatus to access the selected application functionality amongst the specific application functionalities registered for the specific user; and (d) displaying the user-specified parameters selected during the registration session in (a) for the selected application functionality via the operations user interface, before performing the selected application functionality on a basis of the user-specified parameters.

20. The method of claim 19, further comprising:
(d) maintaining, by the application user interface apparatus, in the user information, business relevancy information, obtained in the registration session, indicating a specific business relevancy field pertinent to the registered user; and
(e) receiving user information during the login of the specific user, and utilizing the user information to retrieve the business relevancy information of the specific user; and wherein the operations user interface (UI), provided by the application user interface apparatus in (c), provides application functionalities corresponding to the specific business relevancy field pertinent to the specific user, and does not provide other application functionalities that are unrelated to the specific business relevancy field.

21. The method of claim 19, wherein the application user interface apparatus only registers the selected ones of the plurality of application functionalities for the specific user, if the specific user confirms that the operations user interface including the selected application functionalities is to he provided when the specific user logins in the later op ions session.

22. The method of claim 19, wherein when the operations user interface receives input of a user instruction to access a document, the application user interface apparatus only applies the instruction to the document if it is determined based on user access data that the specific user is authorized to access the document.

* * * * *